April 26, 1932.   C. G. PADEN   1,855,688
LIME SLAKING APPARATUS
Filed Feb. 12, 1929   3 Sheets-Sheet 1
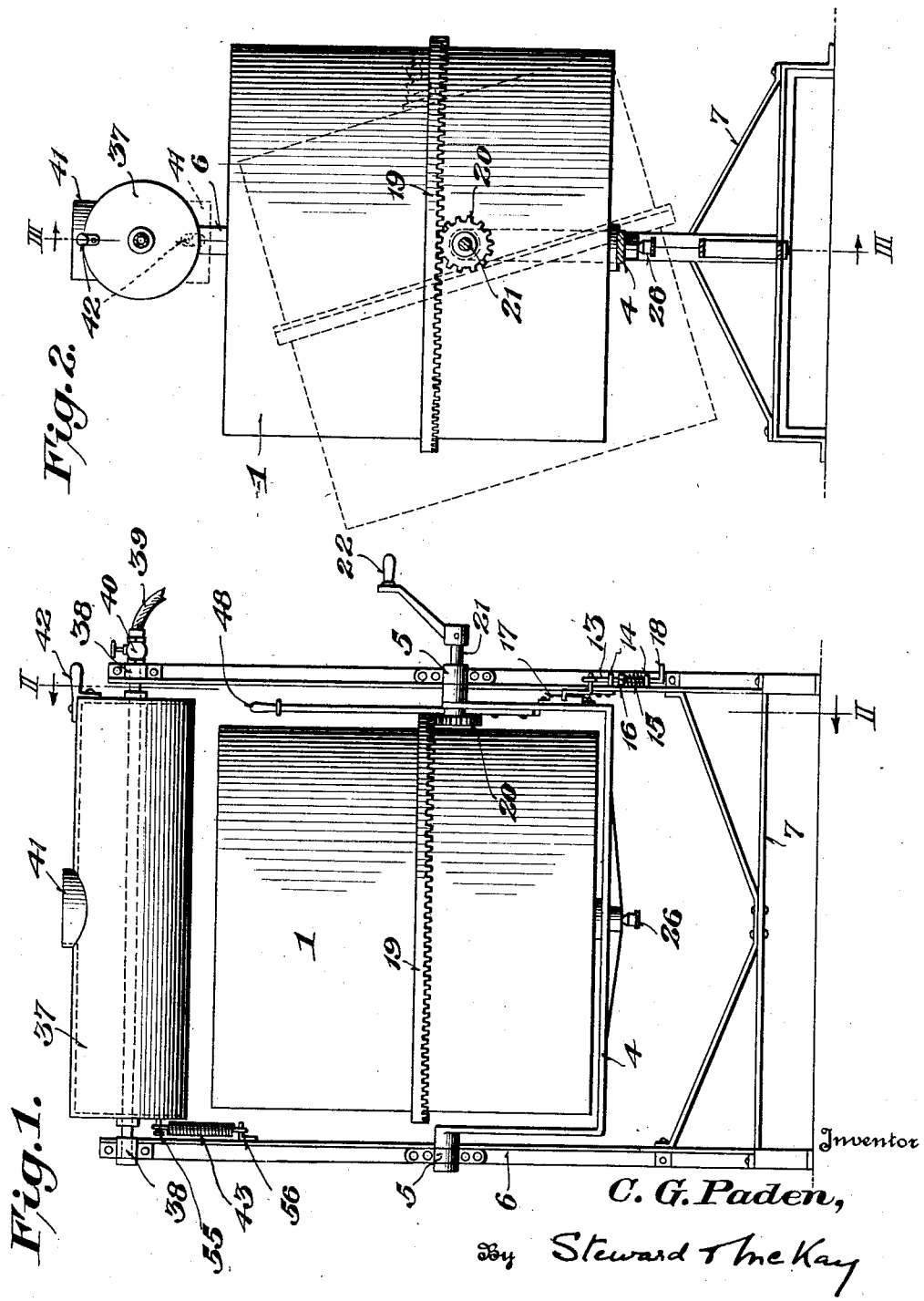
Inventor
C. G. Paden,
By Steward & McKay
Attorney

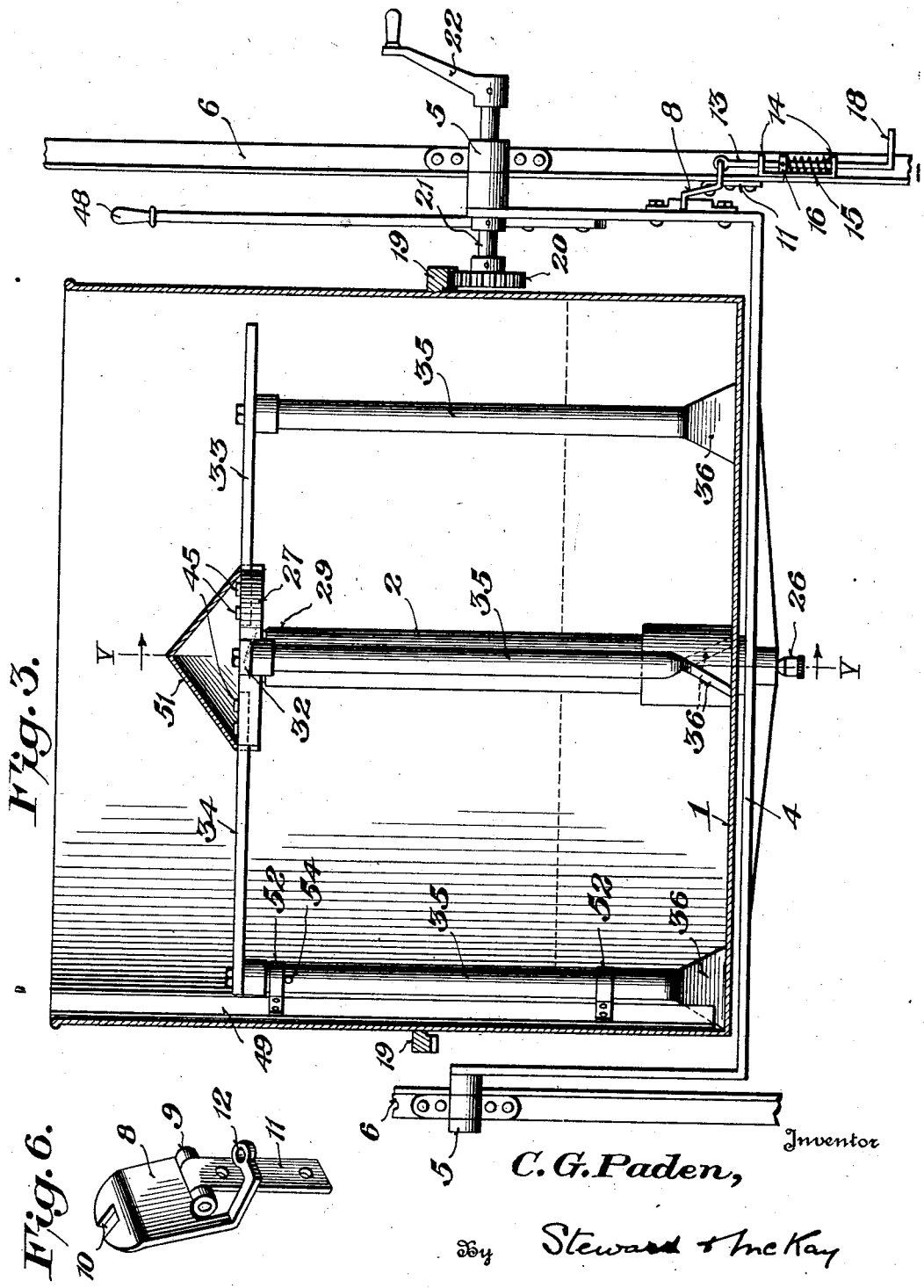

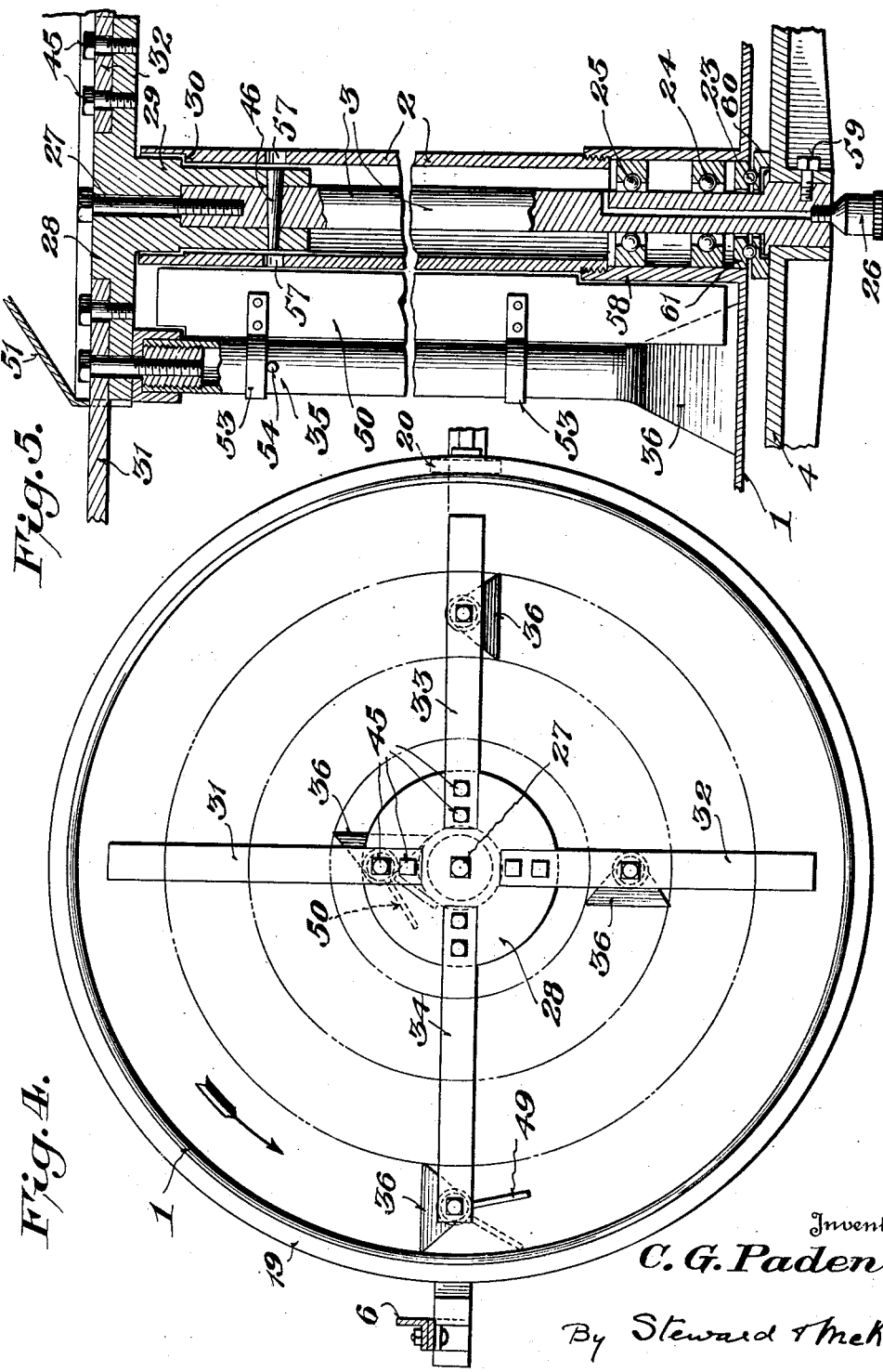

Patented Apr. 26, 1932

1,855,688

UNITED STATES PATENT OFFICE

CHARLES GILBERT PADEN, OF MILLERSTOWN, PENNSYLVANIA

LIME SLAKING APPARATUS

Application filed February 12, 1929. Serial No. 339,356.

This invention relates to the slaking of lime and has especial reference to the slaking of lime for use in plant spray compositions, such as the well-known Bordeaux mixture.

Such compositions are sprayed under high pressure (minimum 200 pounds per sq. in.) through fine nozzles which readily clog necessitating stopping the sprayer, dismantling and cleaning the nozzle. In fact in spraying, more difficulty is experienced from improperly slaked lime than from all other causes.

Heretofore no mechanical apparatus has been available for enabling the slaking operation to be carried out with the great care necessary to be taken in preparing lime for such purposes.

The principal object of the present invention is to provide a simple, cheap, readily operable apparatus which will consistently deliver slaked lime, smooth as butter, completely disintegrated and free from any lumps which might later clog the nozzles of a spraying apparatus.

Bordeaux mixture consists of about 8 pounds of stone lime, 8 pounds of copper sulphate and 100 gallons of water. This quantity of water is far in excess of that required to either slake the lime or to dissolve the copper sulphate. Not only is it far in excess of that required to slake the lime but if any such quantity of water as above indicated were added immediately to the quick lime it would be "drowned" giving a gritty coarse hydrated product. The lime is first slaked with a relatively very small amount of water and then the remaining water added subsequently, preferably just prior to spraying.

Adding too little water is as bad as adding too much, as the lime is apt to "burn" with too little water.

The first step in slaking the lime is to sprinkle or splash water on the lime slowly until the pieces begin to break. Then add the water just rapidly enough to prevent the formation of dust. The contents of the mixing tank or barrel should be stirred continually whilst the water is added to ensure uniform hydration and also to prevent lime caking on the bottom of the barrel. After the violent boiling is over, the material should have the consistency of mush. This plastic condition is a critical stage in the slaking of lime. The lime in this form should be stirred until it is as smooth as butter. Then and not until then should further quantities of water be added to render the contents of the tank sufficiently fluid to dump readily.

While the production of a plastic condition is necessary for preparing a smooth product it renders proper agitation and stirring much more difficult than in the case of thinner and non-plastic mixtures used in other arts.

I have found that the primary difficulty is to stir and agitate all parts of the contents of the mixing tank without causing the contents as a whole to rotate with the stirrers relatively with respect to the tank. Hence too many stirrers are as bad as none at all.

The solution of the problem is to use the minimum number of stirrers. This may be accomplished by dividing the mixing tank into a number of zones, either horizontally or, preferably, vertically and concentrically. Then each zone is preferably provided with one stirrer only. Two stirrers, one traveling behind the other, would not reach any more particles than one but the drag tending to cause the contents as a whole to rotate with the stirrers relatively to the tank would be doubled.

Another important feature is proper control of the water added. This involves two factors, first adequate facilities for observing the changes occurring in the tank as the water is added, and second substantially instantaneously acting means for varying the rate of addition of water to the mass.

These and other important features of the invention will be explained in greater detail in connection with the accompanying drawings, wherein is shown, in preferred form, one embodiment of my invention.

Fig. 1 is a front elevation of the apparatus as a whole.

Fig. 2 is a section on the line II—II of Fig. 1.

Fig. 3 is a section on the line III—III of Fig. 2 with parts omitted.

Fig. 4 is a top plan view of the tank.

Fig. 5 is a section on the line V—V of Fig. 3, and

Fig. 6 is a detailed view showing a part of the latch for preventing premature dumping of the tank contents.

The apparatus consists of a tank 1 of cylindrical form provided with a centrally arranged upwardly extended tube or sleeve 2 which surrounds a spindle 3 secured by a set-screw 59 or the like to a U-shaped frame 4. The sleeve 2 is attached to the tank in any suitable way. One convenient means is by screwing the sleeve 2 into an internally threaded hollow boss 58 at the center of the tank, which boss may be formed with or welded to the bottom of the tank so as to be a part thereof. The tank is free to rotate around the spindle 3 and the sleeve 2 prevents any liquid or material in the tank from entering the space around the spindle 3, clogging the bearings, leaking out onto the floor and so forth.

The ends of this U-shaped frame are arranged to turn in trunnions 5 secured to the uprights 6 of the supporting frame 7 of the apparatus. With this construction, the tank is free to rotate about its axis but may also be tilted into the position shown in dotted lines in Fig. 2 for the purpose of discharging its contents. During the lime slaking operation, however, when the tank is rotated to agitate its contents, the tank 1 should be held in upright position and for this purpose a releasable latch is provided. This latch comprises a notched plate 8 (Fig. 6) hingedly connected at 9 to a plate 11 riveted to one of the uprights 6. The plate 8 has a rearwardly extending arm or projection 12. The end of this arm is apertured for engagement with an eye in the upper end of a rod 13 slidably mounted in brackets 14 attached to the upright 6. Around this rod is arranged a spring 15 (Fig. 3) bearing at its upper end against a collar 16 on the rod 13 and at its lower end against the lower of the two brackets 14. This spring exerts an upward thrust on the rod 13 thereby forcing the notch 10 in the end of the plate 8 into engagement with the outwardly extending flange of a bracket 17 secured to the frame 4, thereby preventing any tilting of the frame 4 and the tank 1 supported thereby. To enable the plate 8 to be readily withdrawn from engagement with bracket 17 the lower end of the rod 13 is bent laterally at 18 for engagement with the hand or foot thereby allowing the rod 13 to be drawn downwardly against the pressure of the spring 15.

As shown, the tank is rotated and the stirrers are held stationary. While the essential feature is to bring about relative movement between the tank and the stirrers, which of course may be accomplished either by holding the tank stationary and moving the stirrers, or by moving the tank and holding the stirrers stationary, it is preferable to bring about this relative movement by rotating the tank. This is preferred for the reason that the tank and its contents are considerably heavier than the stirrers and consequently, by reason of their momentum, act as a fly wheel, aiding in the smooth and uniform agitation of the contents of the tank.

Rotation of the tank about the spindle 3 is conveniently accomplished by providing a peripheral rack 19 (Figs. 1 and 2) which engages a pinion 20 on a shaft 21 which passes through one of the trunnions of the frame 4. To the outer end of this shaft 21 is secured any suitable form of driving mechanism, such as a handle 22.

To aid the rotation of the tank, ball bearings of any suitable kind to take the vertical and lateral thrusts of the tank and its boss 58 against the parts upon and about which the tank and its boss rotate may be provided. One convenient form of ball bearings is shown in Fig. 5, in which three ball bearings are provided, indicated generally at 23, 24 and 25. The lower ball bearing 23 may comprise a ring-like part 60 supported upon a shoulder of the spindle 3, the part 60 having its under portion recessed to engage about the shoulder of the spindle 3, as shown in Fig. 5, the upper surface of this part 60 being provided with a suitable ball race-way as shown. The cooperating part of the bearing with its ball race-way may be a ring 61 fixedly attached to the inner cylindrical face of the boss 58. The remaining ball bearings 24 and 25, as shown in Fig. 5, have rings fixedly attached to the inner wall of the boss 58, and with the ball race-way of each disposed in the annular face opposed to the spindle 3 so that the balls in such race-ways may engage the cylindrical surface of the spindle. The bearing 23 takes the vertical thrust produced by the weight of the tank and its contents while the ball bearings 24 and 25 take any lateral thrust. Lubricant for these ball bearings may be supplied by means of a grease cup 26.

As above indicated, the stirrers are stationary and for this reason are rigidly supported by the spindle 3 about which the tank rotates.

Even more important than the question as to whether the tank or the stirrers shall rotate is the number, disposition and size of the stirrers. The object is to stir and agitate all parts of the contents of the tank without causing the contents as a whole to rotate with the stirrers relatively with respect to the tank. The lime, if it is to be properly hydrated, must pass through a plastic stage and the stirrers must be arranged to agitate substantially all parts of the contents of the tank but also the number, size and area of the stirrers should be so proportioned that the turning effort on the tank contents produced by the stirrers due to the viscosity of the lime whilst in a plastic condition is less than the frictional resistance of the walls of the tank against rotation of the contents of the tank as a whole relatively with respect to the tank.

Various arrangements of stirrers may be used to accomplish this purpose. One of the most satisfactory is to use a series of vertical tubes or rods, each adapted to traverse a different zone in the tank to any of the others, the effective area of each stirrer (i. e. length and width of stirrer in the direction of its radial plane) being a substantial part of the cross-sectional area of the zone of such stirrer. The stirrers as they move through the mass of lime (whether the tank is moved and the stirrers remain stationary, or vice versa) push the particles of lime laterally in both directions and this lateral pushing action should extend over and preferably beyond the particular zone in which each stirrer operates to ensure agitation of all parts of the tank contents. The extent to which this lateral pushing action extends depends on the effective area of the stirrer. As shown, there are four of these stirrers 36 attached to four arms 31, 32, 33 and 34 at different radial distances from the center of the tank outwards to its periphery.

If the stirrers were arranged in a line along a single arm like the teeth on the comb, the lime would be forced to pass through a series of narrow spaces between the stirrers and the drag produced thereby would be much greater than is the case when the stirrers are arranged in different radial planes as shown. By radial planes are meant planes extending from the axis of the tank radially outwardly, so that in the construction illustrated in the drawings there are four of such radial planes.

These arms 31 to 34 (Fig. 4) are supported by a disc 28 (Fig. 5) formed with four radial recesses for the reception of the inner ends of these arms. Bolts 45 hold the arms in place in these recesses.

The disc 28 is attached to the spindle 3 by a centrally arranged depending lug 29 which, as shown in Fig. 5, fits over end of spindle 3. A bolt 27 prevents longitudinal displacement of the disc and lug relatively to the spindle. To carry the torque exerted on the disc it is advisable to employ a pin 46 passing through registering holes in the lug 29 and spindle 3.

The sleeve 2 is formed with apertures 57 to allow the insertion and withdrawal if necessary of the pin.

This lug 29 is provided with a shoulder 30 adapted to contact with the upper end of the sleeve 2 so as to hold the sleeve and with it the tank in position on the spindle 3 when the tank is turned by handle 48 to discharge its contents as indicated in Fig. 2.

As shown (Fig. 5), the stirrers consist of tubes 35 extending vertically from the under side of their supporting arms to the bottom of the tank. At their lower ends these tubes are flattened, as at 36, so as to increase the width of the lower end of each stirrer so that the width of each stirrer where it contacts with the bottom of the tank is approximately one-quarter of the radial distance from the central sleeve 2 to the outer wall of the tank. As there are four stirrers and they are so arranged that each of them sweeps a separate zone to any of the other stirrers, in the manner indicated in Fig. 4, the entire bottom of the tank is swept by the stirrers, thereby avoiding lime sticking or "freezing" thereto. Preferably the lower ends of the stirrers are bent forwardly in a direction opposite to the direction of movement of the contents of the tank relative to the stirrers so as to give the latter a plowing action on the tank contents at the bottom of the tank. The stirrers are all rigidly connected to their respective supporting arms so that this desired plowing action is always obtained.

In discharging the tank, lime is apt to remain sticking to the sides of the tank and preferably, therefore, means are provided for scraping such lime off the wall of the tank and off the central sleeve 2.

This may be accomplished by constructing the innermost and outermost stirrers so that they scrape the walls of the tank and the central sleeve at all times. Ordinarily this is not necessary and it is sufficient if the stirrers are arranged so that they only scrape the sides of the tank when the tank is being discharged. For this latter purpose the outermost and the innermost stirrers are provided with scraper plates 49 and 50 (Figs. 3, 4 and 5) pivotally connected to the stirrers by encircling straps 52 and 53 respectively. Pins 54 hold the scraper plates in position vertically. When the tank is turned in the direction of the arrow shown in Fig. 4, the scraper plates trail behind the stirrers as indicated in full lines in Fig. 4 with respect to the scraper plate 49. When, however, the direction of the rotation of the tank is reversed, the scraper plates 49 and 50 are forced against the outer wall of the tank and the central sleeve respectively (dotted line position of scraper 49 shown in Fig. 4) removing thereby any adhering lime therefrom. Alternatively the scraper plates may be turned by hand through, say 200°, and the tank in that case will be cleaned if it is rotated in the direction shown by the arrow in Fig. 4.

It has been found that it is important to be able to add water to the mass of lime in the tank almost instantly in any desired amount and that the use of a hose or a faucet is often too slow for the most advantageous results. This difficulty may be avoided by employing a tank 37 (Figs. 1 and 2) pivotally supported by trunnions 38 secured to the uprights 6 of the main frame of the apparatus directly over the tank 1. One of these trunnions is made hollow so that water through a hose 39 and valve 40 may be admitted into the interior of the tank 37. A discharge aperture 41 is provided on the upper side of this water tank so that by swinging the latter around its axis by means of a handle 42, the entire contents of the tank or any desired part thereof may be substantially instantly added to the lime in the main tank. A conical hood 51 over the disc 28 aids in the uniform spreading of the water over the lime.

This water tank is normally held with its discharge aperture on top by a spring 43 connected at one end to a pin 55 on the tank 37 and at the other to a bracket or the like 56 on the upright 6.

The operation of the apparatus is as follows.

A charge of quick lime is inserted into the tank 1 and the water tank 37 is filled through hose 39 by opening the valve 40.

The tank 1 is then set in rotation by the handle 22 and water added to the lime by tilting the water tank 37. Agitation and the addition of water from time to time are continued until the lime has been properly slaked.

After the slaked lime reaches the consistency of smooth shaving cream further quantities of water should be added and stirring continued until the pasty mass has completely disintegrated and the proportion of lime to water is about one pound to one gallon of water. The mixture is then ready to dump into a storage tank or into a mixing barrel for making Bordeaux mixture. The latter is ordinarily made immediately prior to use by mixing a solution of copper sulphate, say 1 pound to 1 gallon with milk of lime, prepared as above described, with about 1 pound of lime per gallon of water and adding further water to bring the concentration down to about 8 pounds of lime and 8 pounds of copper sulphate per 100 gallons of water.

What I claim is:

1. A lime slaking apparatus including a main frame having a pair of uprights, a tank pivotally supported between said uprights to receive a charge of lime, a water tank pivotally supported between said uprights above said tank having an aperture for the discharge of water therefrom into the lime tank, when said water tank is turned about its axis, a spreader mounted centrally in the upper portion of the lime tank, and means for agitating the contents of the lime tank.

2. A lime slaking apparatus including a circular tank, a plurality of stirrers therein in different radial planes and each adapted to traverse a different zone in the tank to any of the other stirrers and to agitate substantially all of the material in its own zone, means adapted to add to the tank a considerable volume of water substantially instantaneously, a central support in the tank for the stirrers and means mounted on said support for spreading the water uniformly over the lime.

3. A lime slaking apparatus for preparing smooth plastic hydrated lime including a circular tank, a plurality of stirrers therein arranged parallel to the axis of the tank in staggered relation so that each stirrer traverses a different zone in the tank to any of the others and all the zones completely cover the bottom of the tank, and a scraper freely pivoted to one of said stirrers for removing slaked lime from the adjacent curved surface of the tank while either projecting in front of the stirrer or behind it.

In testimony whereof I hereunto affix my signature.

CHARLES GILBERT PADEN.